United States Patent
Bhattacharya et al.

(10) Patent No.: US 12,141,463 B2
(45) Date of Patent: Nov. 12, 2024

(54) STUN FREE SNAPSHOTS IN VIRTUAL VOLUME DATASTORES USING DELTA STORAGE STRUCTURE

(71) Applicant: VMware, Inc., Palo Alto, CA (US)

(72) Inventors: Indranil Bhattacharya, Bangalore (IN); Ashutosh Saraswat, Bangalore (IN); Thorbjoern Donbaek Jensen, Hoejbjerg (DK)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/201,130

(22) Filed: May 23, 2023

(65) Prior Publication Data

US 2024/0248629 A1  Jul. 25, 2024

(51) Int. Cl.
*G06F 3/06* (2006.01)
(52) U.S. Cl.
CPC ............ *G06F 3/065* (2013.01); *G06F 3/0611* (2013.01); *G06F 3/067* (2013.01)
(58) Field of Classification Search
CPC ......... G06F 3/0611; G06F 3/065; G06F 3/067
See application file for complete search history.

(56) References Cited

U.S. PATENT DOCUMENTS

| | | | | |
|---|---|---|---|---|
| 2005/0223180 | A1* | 10/2005 | Derbeko | G06F 3/0656 711/162 |
| 2015/0186044 | A1* | 7/2015 | Sharma | G06F 3/0683 711/162 |
| 2018/0157561 | A1 | 6/2018 | Venkatesh et al. | |
| 2019/0354708 | A1 | 11/2019 | Fisher et al. | |
| 2020/0081704 | A1 | 3/2020 | Bafna et al. | |

FOREIGN PATENT DOCUMENTS

WO   WO-2012-177445 A2   12/2012

OTHER PUBLICATIONS

Extended European Search Report, European Application No. 24152698.7 dated May 21, 2024, 11 pages.

* cited by examiner

*Primary Examiner* — Chie Yew
(74) *Attorney, Agent, or Firm* — King Intellectual Asset Management

(57) ABSTRACT

The disclosure provides a method for virtual volume snapshot creation by a storage array. The method generally includes receiving a request to generate a snapshot of a virtual volume associated with a virtual machine, in response to receiving the request, preparing a file system of the storage array to generate the snapshot, wherein preparing the file system comprises creating a delta storage structure to receive write input/output (I/O) requests directed for the virtual volume when generating the snapshot of the virtual volume, deactivating the virtual volume, activating the delta storage structure, generating the snapshot of the virtual volume, and during the generation of the snapshot of the virtual volume: receiving a write I/O directed for the virtual volume and committing the write I/O in the delta storage structure.

20 Claims, 4 Drawing Sheets

STUN FREE SNAPSHOTS IN VIRTUAL VOLUME DATASTORES USING DELTA STORAGE STRUCTURE

CROSS-REFERENCE TO RELATED APPLICATIONS

Benefit is claimed under 35 U.S.C. 119(a)-(d) to Foreign Application Serial No. 202341003777 filed in India entitled "STUN FREE SNAPSHOTS IN VIRTUAL VOLUME DATASTORES USING DELTA STORAGE STRUCTURE", on Jan. 19, 2023 by VMware, Inc., which is herein incorporated in its entirety by reference for all purposes.

BACKGROUND

As computer systems scale to enterprise levels, particularly in the context of supporting large-scale data centers, the underlying data storage systems frequently employ a storage area network (SAN) or network attached storage (NAS). SAN or NAS provides a number of technical capabilities and operational benefits, including virtualization of data storage devices, redundancy of physical devices with transparent fault-tolerant fail-over and fail-safe controls, geographically distributed and replicated storage, and centralized oversight and storage configuration management decoupled from client-centric computer systems management.

Architecturally, the storage devices in a SAN storage system include storage arrays, also referred to as disk arrays, which are dedicated storage hardware that contain multiple disk drives. The storage arrays are typically connected to network switches (e.g., Fibre Channel switches, etc.) which are then connected to servers or "hosts" (e.g., having virtual machine (VMs) running thereon) that require access to the data in the storage arrays.

Conventional storage arrays store persistent data in coarse storage containers such as logical unit numbers (LUNs) or file system volumes. This means that if a conventional storage array needs to apply service policies or management operations to its stored data, the array can only do so on a per-LUN/file system volume basis because the LUN/file system volume is the smallest logical unit of storage that is understood by the array. This limitation can be problematic in virtualized deployments where there is a many-to-one mapping between storage clients, such as a VMs, and LUNs/file system volumes. In these deployments, each VM may require a certain quality of service (QOS) and/or storage management operations that are specific to its data. However, because the data for multiple VMs is contained in one LUN/file system volume, the storage array cannot distinguish one VM from another and thus cannot autonomously apply storage policies/operations on a per-VM basis.

To address the foregoing, a framework has been developed (referred to herein as the "virtual volume framework") that enables storage arrays to understand and manage data in the form of more granular logical storage objects known as virtual volumes (vvols) (also referred to herein as "logical storage volumes"). Vvols are encapsulations of virtual machine files, virtual disks, and/or their derivatives. Unlike LUNs and file system volumes, each vvol is configured to hold the persistent data (e.g., virtual disk data, VM configuration data, etc.) for a particular VM. In other words, each vvol may include a virtual disk of a particular VM, and the particular VM may have multiple vvol (e.g., where the particular VM has multiple virtual disks). With this framework, the platform components in a virtualized deployment can inform a virtual volume-enabled storage array of service policies or management operations that are needed with respect to specific virtual volumes (and thus, specific VMs), thereby providing more granularity to the system. The virtual volume-enabled storage array can then autonomously apply the policies or operations to the specified virtual volumes. Additional details regarding vvols and the virtual volume framework are provided in U.S. Pat. No. 8,775,773, issued Jul. 8, 2014, and entitled "Object Storage System," the entire contents of which are incorporated by reference herein, and U.S. Pat. No. 8,775,774, issued Jul. 8, 2014, and entitled "Management System and Methods for Object Storage System," the entire contents of which are incorporated by reference herein.

The virtual volume framework may enable snapshot features for backup, archival, and/or data protection purposes. Some snapshot features provide the ability to capture a point-in-time state and data of a VM and/or one or more of its vvols (e.g., virtual disks) to not only allow data to be recovered in the event of an attack but restored to known working points. In some implementations, producing a snapshot of a VM and its vvol(s) requires the VM to be stunned. A VM "stun" operation causes execution of the VM to be paused. Prior to the "stun" operation, in-flight disk I/Os (e.g., to a virtual disk of the VM, encapsulated in a vvol) are allowed to complete and, more specifically, are committed to the vvol. In other words, prior to when a VM is "stunned" (e.g., quiesced), a state of the VM is serialized to the disk. Once the VM is stunned, a snapshot may be taken to capture the VM's memory state, disk state, and configuration settings at the specific point in time. The VM remains stunned for the entire duration of the snapshot creation.

Ongoing processes at the VM, including processing I/O operations directed to vvol(s)/virtual disk(s) of the VM, are suspended while the VM is stunned and the snapshot is taken. Snapshot creation can result in a long stun time where there are many configured disks, or in other words, a large number of vvols per VM. Snapshot creation can result in a long stun time where a large number of VMs are to be stunned and snapshotted concurrently. For example, VMs having vvols which are physically co-located may be stunned simultaneously for snapshot creation to ensure data consistency. Further, snapshot creation can result in a long stun time where basic file system operations, such as opening files, are taking a long time (e.g. where the datastore is overloaded). Long stun times during snapshot creation may adversely affect performance of the system (e.g. result in overall lower performance), and thus be undesirable.

It should be noted that the information included in the Background section herein is simply meant to provide a reference for the discussion of certain embodiments in the Detailed Description. None of the information included in this Background should be considered as an admission of prior art.

SUMMARY

One or more embodiments provide a method for virtual volume snapshot creation by a storage array. The method generally includes receiving a request to generate a snapshot of a virtual volume associated with a virtual machine. The method generally includes, in response to receiving the request, preparing a file system of the storage array to generate the snapshot. Preparing the file system includes creating a delta storage structure to receive write input/output (I/O) requests directed for the virtual volume when generating the snapshot of the virtual volume. The method generally includes deactivating the virtual volume and activating the delta storage structure. The method generally includes generating the snapshot of the virtual volume. The method generally includes, during the generation of the snapshot of the virtual volume, receiving a write I/O directed for the virtual volume and committing the write I/O in the delta storage structure.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
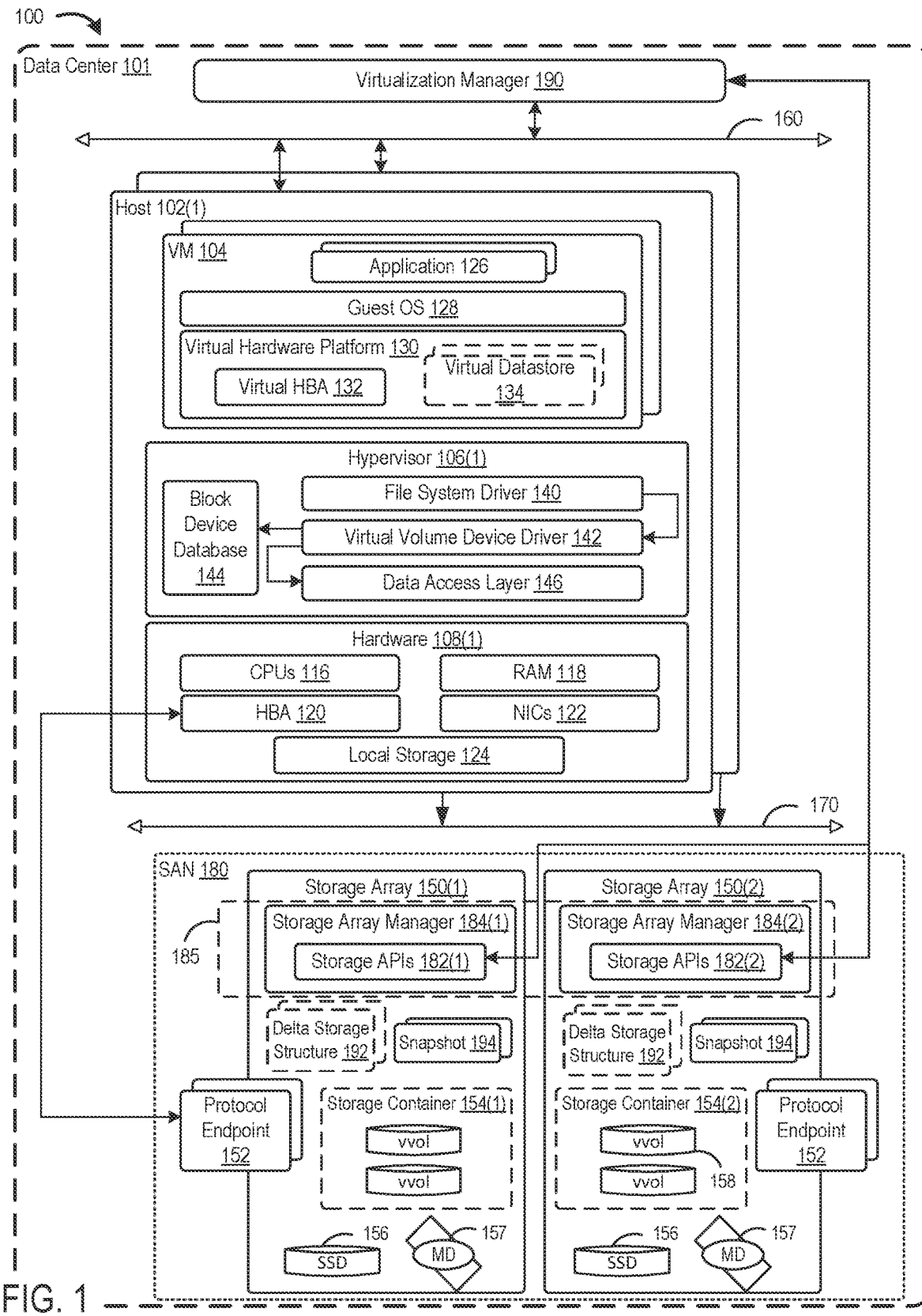
FIG. 1 illustrates an example network environment in which embodiments described herein may be implemented.

Techniques for stun-free snapshot creation are provided herein. More specifically, the techniques described herein may be used to generate snapshots of virtual volume(s) (vvol(s)) associated with one or more VMs without pausing the execution of processes, including input/output (I/O) operations, at the VMs. Although techniques provided herein are described with respect to vvol snapshot generation, the techniques may be similarly applied to other types of snapshot generation.

To allow for such stun-free operations, a delta storage structure may be created for each vvol that is to be snapshotted. As used herein, a delta storage structure is any structure suitable for storing changes to block data, such as another vvol, a queue (e.g., persistent FIFO queue), etc., that is implemented by a storage array. The delta storage structure maintains changes to blocks of its corresponding vvol for the time period between when the delta storage structure is created and the corresponding vvol is deactivated and when the corresponding vvol is re-activated (e.g., after a snapshot is created for the vvol). Each delta storage structure created may be configured to capture and track block changes (e.g., caused by incoming I/O writes from applications running on a VM associated with the vvol) as opposed to writing these changes directly to blocks of the corresponding vvol. As such, a state of the VM's virtual disk (e.g., encapsulated in the vvol) at the particular point in time may be captured in a snapshot while continuing to allow for incoming I/O writes directed to blocks of the VM's virtual disk. The incoming write changes to blocks of the vvol may be stored in the delta storage structure until the snapshot is successfully generated for the vvol. Subsequently, each of the block changes (e.g., captured in the delta storage structure) may be removed from the delta storage structure and merged into its respective vvol. The delta storage structure may be deactivated when all block changes are removed from the delta storage structure. Accordingly, delta storage structures created and activated during snapshot creation may help to remove the requirement of freezing I/O writes to vvols. The ability to continue I/O operations while simultaneously generating vvol snapshots allows for the continuous delivery of operations at the VMs (e.g., having their vvols snapshotted) thereby improving overall system performance for a user.

Additionally, implementing delta storage structures during vvol snapshot creation may allow a storage array to define new consistency groups of vvols independent of the internal file system of the storage array and/or volume boundaries. In particular, a consistency group is a collection of volumes in a storage array that are to be managed as one entity. A snapshot taken for a consistency group involves taking a snapshot for all volumes of the consistency group at the same point-in-time. As such, a consistency group enables users to take simultaneous snapshots of several volumes, thus ensuring consistent copies of a group of volumes. Without the use of delta storage structures as described herein, consistency groups which could be created for a number of volumes were limited based on volume boundaries. For example, to ensure that a snapshot was crash consistent, a storage array previously had to implement I/O fencing mechanisms. I/O fencing is a mechanism by which a storage array stalls and/or fences write I/O's to a set of LUNs in a storage array when the storage array is taking a snapshot of a set of vvols and/or replicating the set of vvols to a peer array. Because I/O fencing is implemented by the storage array per volume, snapshots had to adhere to volume boundaries. Using the techniques herein for creating delta storage structures during snapshot creation, however, consistency groups may not be limited as such. Instead, the storage array may define any set of crash consistent vvols which are independent of the underlying file system. Further, in certain embodiments, a user may define a consistency group for which snapshots are to be taken. A consistency group may include, for example, all vvols being used by a VM, all vvols being used by a container, and/or all vvols being used by a cluster application running on multiple VMs, to name a few.

FIG. 1 illustrates example physical and virtual network components in a networking environment 100 in which embodiments described herein may be implemented.

Networking environment 100 includes a data center 101. Data center 101 includes one or more hosts 102, a management network 160, a data network 170, and a virtualization manager 190. Data network 170 and management network 160 may be implemented as separate physical networks or as separate virtual local area networks (VLANs) on the same physical network.

Host(s) 102 may be communicatively connected to data network 170 and management network 160. Data network 170 and management network 160 are also referred to as physical or "underlay" networks, and may be separate physical networks or the same physical network. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be configured to provide a virtualization layer, also referred to as a hypervisor 106, that abstracts processor, memory, storage, and networking resources of a hardware platform 108 into multiple VMs 104.

In certain embodiments, hypervisor 106 may run in conjunction with an operating system (not shown) in host 102. In certain embodiments, hypervisor 106 can be installed as system level software directly on hardware platform 108 of host 102 (often referred to as "bare metal" installation) and be conceptually interposed between the physical hardware and guest operating systems (OSs) 128 executing in the VMs 104. It is noted that the term "operating system," as used herein, may refer to a hypervisor.

Each of VMs 104 implements a virtual hardware platform that supports the installation of guest OS 128 which is capable of executing one or more applications 126. Guest OS 128 may be a standard, commodity operating system. Examples of a guest OS 128 include Microsoft Windows, Linux, and/or the like. An application 126 may be any software program, such as a word processing program. Although the example embodiment shown in FIG. 1 illustrates storage as a SAN-based storage system, in some embodiments, the underlying data storage system may be a network attached storage (NAS).

In certain embodiments, guest OS 128 includes a native file system layer that interfaces with virtual hardware platform 130 to access, from the perspective of each application 126 (and guest OS 128), a data storage host bus adapter (HBA), which in reality, is virtual HBA 132 implemented by virtual hardware platform 130 that provides, to guest OS 128, the functionality of disk storage support to enable execution of guest OS 128 as though guest OS 128 is executing on physical system hardware. A virtual disk, as is known in the art, is an abstraction of a physical storage disk that a VM 104 (e.g., an application 126 running in VM 104) accesses via input/output (I/O) operations as though it was a physical disk. A virtual disk file is created for each virtual disk, the virtual disk file being stored in physical storage and storing the data corresponding to the virtual disk.

Host(s) 102 may be constructed on a server grade hardware platform 108, such as an x86 architecture platform. Hardware platform 108 of a host 102 may include components of a computing device such as one or more processors (CPUs) 116, system memory (e.g., random access memory (RAM)) 118, one or more host bus adaptors (HBAs) 120, one or more network interfaces (e.g., network interface cards (NICs) 122), local storage resources 124, and other components (not shown). A CPU 116 is configured to execute instructions, for example, executable instructions that perform one or more operations described herein and that may be stored in the memory and storage system. The network interface(s) enable host 102 to communicate with other devices via a physical network, such as management network 160 and data network 170. Further, the HBA(s) 120 and network interface(s) enable host 102 to connect to storage area network (SAN) 180.

Local storage resources 124 may be housed in or directly attached (hereinafter, use of the term "housed" or "housed in" may be used to encompass both housed in or otherwise directly attached) to hosts 102. Local storage resources 124 housed in or otherwise directly attached to the hosts 102 may include combinations of solid state drives (SSDs) 156 or non-volatile memory express (NVMe) drives, magnetic disks (MD) 157, or slower/cheaper SSDs, or other types of storages. Local storage resources 124 of hosts 102 may be leveraged to provide aggregate object-based storage to VMs 104 running on hosts 102. The distributed object-based store may be a SAN 180.

SAN 180 is configured to store virtual disks of VMs 104 as data blocks in a number of physical blocks, each physical block having a physical block address (PBA) that indexes the physical block in storage. An "object" for a specified data block may be created by backing it with physical storage resources of the objected-based storage (e.g., based on a defined policy). Although the example embodiment shown in FIG. 1 illustrates storage as a SAN-based storage system, in some embodiments, the underlying data storage system may be a network attached storage (NAS). For example, instead of using local storage 124 of various hosts 102, dedicated network accessible storage resources may be used as the storage system.

Architecturally, SAN 180 is a storage system cluster including one or more storage arrays 150 (e.g., storage array 150(1) and storage array 150(2) illustrated in FIG. 1) which may be disk arrays. Storage arrays 150 each have a plurality of data storage units (DSUs) and storage array managers 184 (e.g., storage array manager 184(1) and storage array manager 184(2) illustrated in FIG. 1) that control various operations of storage arrays 150. Storage array managers 184 represent one or more programmed storage processors. In one embodiment, two or more storage arrays 150 may implement a distributed storage array manager 185 that controls the operations of the storage system cluster as if they were a single logical storage system. DSUs represent physical storage units, for example, disk or flash based storage units such as SSDs 156 and/or MDs 157.

According to embodiments described herein, SAN 180 (e.g., the cluster of storage arrays 150(1) and 150(2)) creates and exposes "virtual volumes 158" (vvols 158) to connected hosts 102. In particular, distributed storage array manager 185 or a single storage array manager 184(1) or 184(2) may create vvols 158 (e.g., upon request of a host 102, etc.) from logical "storage containers 154." Storage containers 154 each represent a logical aggregation of physical DSUs. In general, a storage container 154 may span more than one storage array 150 and many storage containers 154 may be created by a single storage array manager 184 or a distributed storage array manager 185. Similarly, a single storage array 150 may contain many storage containers 154. Storage containers 154 logically group vvols 158 based on management and administrative needs. The number of storage containers 154, their capacity, and their size may depend on a vendor-specific implementation. From the perspective of host 102, storage containers 154 are presented as virtual datastores 134 in virtual hardware platforms 130 of each VM 104 on host 102 (e.g., virtual datastores 134 are storage containers 154 in disguise).

Vvols 158, created by SAN 180, are block-based objects of a contiguous range of blocks (e.g., block1, block2, . . . blockN). Vvols 158 may be fully represented (e.g., thick provisioned and have a fixed physical size) or may be partially represented (e.g., thinly provisioned) in storage arrays 150. Each vvol 158 has a vvol ID, which is a universally unique identifier that is given to the vvol 158 when the vvol 158 is created. Each created vvol 158 is configured to hold the persistent data (e.g., a virtual disk) for a particular VM. In particular, for a VM 104, a vvol 158 may be created for each virtual disk of the VM 104. For each vvol 158, a vvol database (not shown) may store a vvol ID, a container ID of the storage container 154 in which the vvol 158 is created, and an ordered list of <offset, length> values within that storage container 154 that comprise the address space of the vvol 158. The vvol database may be managed and updated by distributed storage array manager 185 or storage array manager(s) 184.

Each storage array 150 may further implement one or more protocol endpoints 152. In particular, storage arrays 150 implement protocol endpoints 152 as a special type of LUN using known methods for setting up LUNs (e.g., in SAN-based storage systems). As with LUNs, a storage array 150 provides each protocol endpoint 152 a unique identifier, for example, a WWN (World Wide Name). A protocol endpoint 152 of a storage array 150 acts as a proxy to direct information coming from each host 102 to a correct storage container 154 and vvol 158 on the storage array 150. Each storage container 154 may have one or more protocol endpoints 152 associated with it; however, a protocol endpoint 152 may only be associated with a single storage container 154.

From the perspective of each application 126 (and guest OS 128), file system calls are initiated by each application 126 to implement file system-related data transfer and control operations (e.g., read and/or write I/Os), such as to their storage virtual disks. The applications 126 may not be aware that the virtual disks are backed by vvols 158. Such calls are translated by guest OS 128 into disk sector I/O requests that are passed through virtual HBA 132 to hypervisor 106. These requests may be passed through various layers of hypervisor 106 to true hardware HBAs 120 or NICs 122 that connect to SAN 180.

For example, I/Os from applications 126 are received by a file system driver 140 (e.g., different from a virtual machine file system (VMFS) file driver) of hypervisor 106, which converts the I/O requests to block I/Os, and provides the block I/Os to a virtual volume device driver 142 of hypervisor 106. The I/Os received by file system driver 140 from applications 126 may refer to blocks as offsets from a zero-based block device (e.g., vvol 158 is a LUN with a zero-base block range).

When virtual volume device driver 142 receives a block I/O, virtual volume device driver 142 accesses a block device database 144 to reference a mapping between the block device name (e.g., corresponding to a block device instance of a vvol 158 that was created for application 126) specified in the I/O and a protocol endpoint 152 ID (WWN of the protocol endpoint 152 LUN) associated with the vvol 158.

In addition to performing the mapping described above, virtual volume device driver 142 issues raw block-level I/Os to data access layer 146 of hypervisor 106. Data access layer 146 is configured to apply command queuing and scheduling policies to the raw block-level I/Os. Further, data access layer 146 is configured to format the raw block-level I/Os in a protocol-compliant format (e.g., small computer system interface (SCSI) compliant) and send them to HBA 120 for forwarding to the protocol endpoint 152. The protocol endpoint 152 then directs the I/O to the correct vvol 158.

In certain embodiments, virtualization manager 190 is a computer program that executes in a server in data center 101, or alternatively, virtualization manager 190 runs in one of VMs 104. Virtualization manager 190 is configured to carry out administrative tasks for the data center 101, including managing hosts 102, managing (e.g., configuring, starting, stopping, suspending, etc.) VMs 104 running within each host 102, provisioning VMs 104, transferring VMs 104 from one host 102 to another host 102, transferring VMs 104 between data centers, transferring application instances between VMs 104 or between hosts 102, and load balancing VMs 104 among hosts 102 within a host cluster. Virtualization manager 190 may carry out such tasks by delegating operations to hosts 102. Virtualization manager 190 takes commands as to creation, migration, and deletion decisions of VMs 104 and application instances on the data center 101. However, virtualization manager 190 also makes independent decisions on management of local VMs 104 and application instances, such as placement of VMs 104 and application instances between hosts 102.

In certain embodiments, storage application programming interfaces (APIs) 182 are implemented at storage array managers 184(2) (e.g., storage API 182(1) implemented at storage array manager 184(1) and storage API 182(2) implemented at storage array manager 184(2)). Storage APIs 182 are a set of APIs that permit storage arrays 150 to integrate with virtualization manager 190 for management functionality. For example, storage APIs 182 allow storage arrays 150, and more specifically storage array managers 184, to communicate with virtualization manager 190, to, for example, provide storage health status, configuration information, capacity, and/or the like.

In certain embodiments, storage APIs 182 are also used by hosts 102 to initiate the creation of snapshots for one or more vvols 158. In particular, in certain embodiments, data protection features, such as snapshotting, are enabled to provide data protection for VMs 104, and their corresponding virtual disks (as vvols 158). A snapshot 194 is a copy of a VM 104's disk file (e.g., virtual disk) at a given point in time. Snapshots 194 provide a change log for the virtual disk and are used to restore the VM 104 to a particular point in time prior to when a failure, a system error, and/or a malware attack occurs. For example, advanced ransomware attacks may delete, recreate, and/or change file names and/or content thereby affecting a virtual disk file. Snapshots 194 help to recover from such attacks by allowing data to be restored to a point in time prior to the infection.

In some implementations, generating a snapshot 194 of a vvol 158 occurs in two phases. For example, in the first phase (e.g., a prepare phase), a storage array 150 storing the vvols 158 that are be snapshotted, prepares the file system of storage array 150 for snapshotting. In particular, host 102 may call, via an API (e.g., a preparetosnapshotvirtualvolume API call), storage array 150 to initiate snapshot creation for one or more vvols 158 managed by storage array 150. In response to receiving the call, storage array 150, and more specifically storage array manager 184 of storage array 150, may create a snapshot object to hold each snapshot that is to be created. Each snapshot object has a snapshot universally unique identifier (UUID), which is a universally unique identifier that is given to the snapshot object when the snapshot object is created. Each created snapshot object is configured to hold the snapshot for a particular vvol 158. The UUIDs assigned to each created snapshot object may be provided to host 102 (e.g., the host making the initial call). Further, during the prepare phase, while storage array 150 is preparing the file system for snapshotting, host 102 may request that VM 104, that is to be snapshotted, begin the process of quiescing (e.g., pause or alter the VM 104 and its applications 126 to achieve a consistent state) and flushing all I/Os to their respective vvols 158 in storage array 150. For example, for a Windows VM 104 and its applications 126, a call may be made to Microsoft Volume Shadow Copy Service (VSS) to bring VM 104 and applications 126 to a quiesced state.

As an illustrative example, and not meant to be limiting to this particular example, host 102 may request that storage array 150(1) create a snapshot for VM 104, where VM 104 has five vvols 158 that are managed by storage array 150(1). Storage array 150(1) may create five snapshot objects, where each snapshot object corresponds to one of the five vvols 158 that are to be snapshotted. Storage array 150(1) may assign a UUID to each of the five snapshot objects, and provide these five UUIDs to host 102. During creation of each of the five snapshot objects, host 102 may request that VM 104 begin quiescing all ongoing processes on VM 104 and flush all in-flight I/Os to their respective virtual disks (e.g., respective vvols 158) to stun VM 104.

As such, in the beginning of the second phase, VM 104 is stunned. After the stun operation is complete, host 102 uses the UUIDs provided by storage array 150 to request (e.g., via a synchronous API call, such as a snapshotvirtualvolume API call) that storage array 150 commit the snapshot. Committing the snapshot involves storage array manager 184 generating a snapshot of each vvol 158 that is to be snapshotted, and storing each generated snapshot in its corresponding snapshot object (e.g., created in phase one). According to this snapshot creation process, host 102 makes the request to commit the snapshot only after stunning VM 104. VM 104 may not issue any I/Os while stunned. In particular, no I/Os to VM 104's vvols 158 can be issued during the entire duration of the second phase to allow for consistent snapshots of vvols 158 to be taken.

As described above, snapshot creation during the second phase may take a considerable about of time, especially in cases where the VM 104 has multiple vvols 158 that are to be snapshotted and/or where vvols 158 of multiple VMs 104 are to be snapshotted (e.g., causing VMs 104 to be stunned for an amount of time it takes to create a snapshot for each vvol 158 of each VM 104). Further, snapshot creation may result in a long stun time for VM(s) 104 where basic file system operations, such as opening files, are taking a long time (e.g. where the datastore is overloaded). Overall system performance may be adversely affected where long stun times are encountered during snapshot creation. For example, a user may expect their applications 126, particularly with respect to mission-critical applications, running on VMs 104 to be continuously available and operating, and more specifically, having processes running thereon with minimal or no downtime. As such, long stun times, which cause I/O operations to vvols 158 of VMs 104 to halt, may be undesirable by the user.

Accordingly, techniques provided herein introduce the use of delta storage structures 192 to remove the requirement of freezing the issuance of I/Os to vvols 158 during snapshot creation. The ability to continue I/O operations while simultaneously generating vvol 158 snapshots allows for the continuous delivery of operations at VMs 104 thereby improving overall system performance for a user. Further, operations at the VM 104 may not be affected by the length of time it takes for such snapshot creation.

Figure 2A:
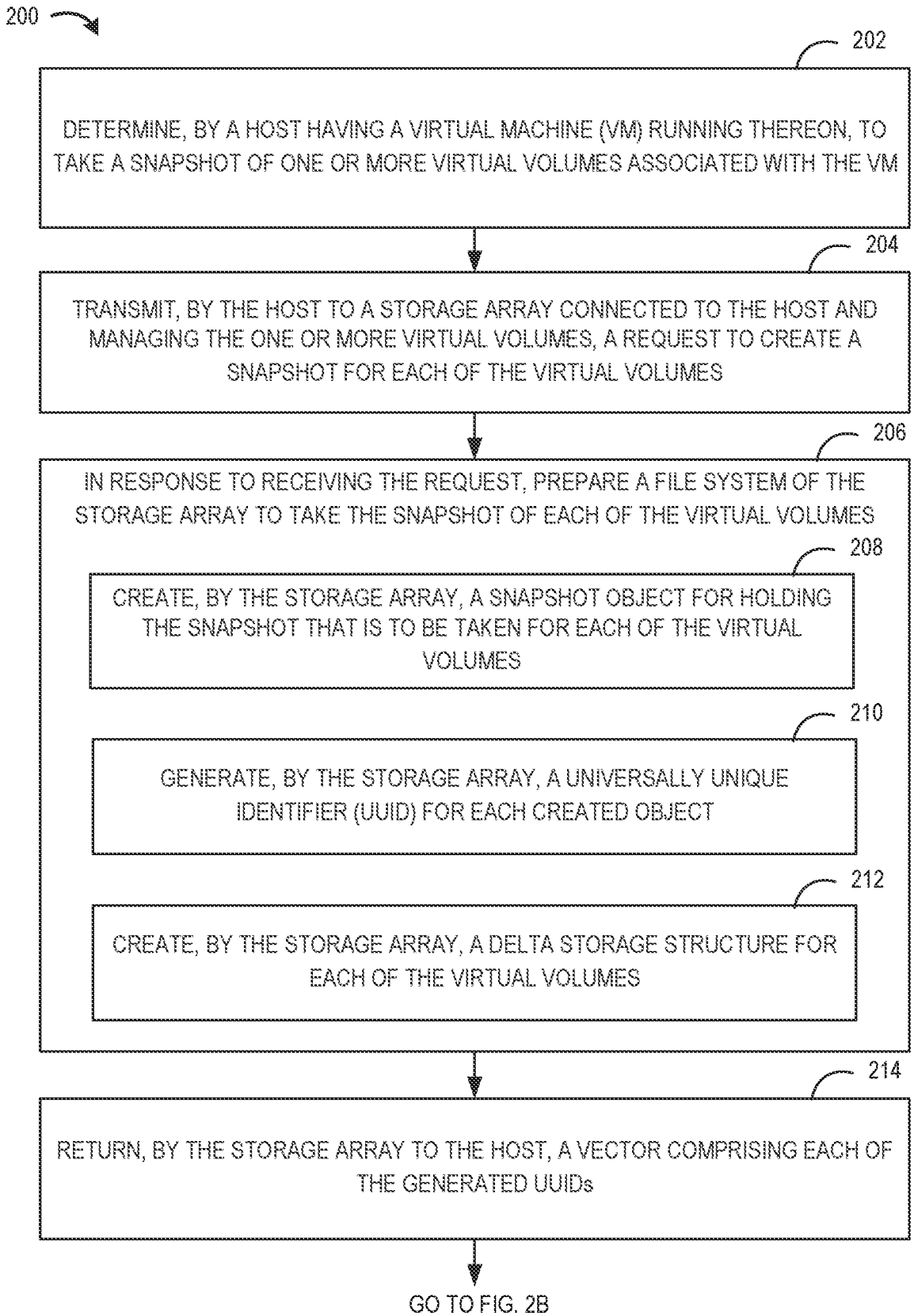
FIG. 2A is a flow diagram illustrating example operations for preparing a storage array file system to create snapshots of virtual volumes (vvols), according to an example embodiment of the present disclosure.
Figure 2B:
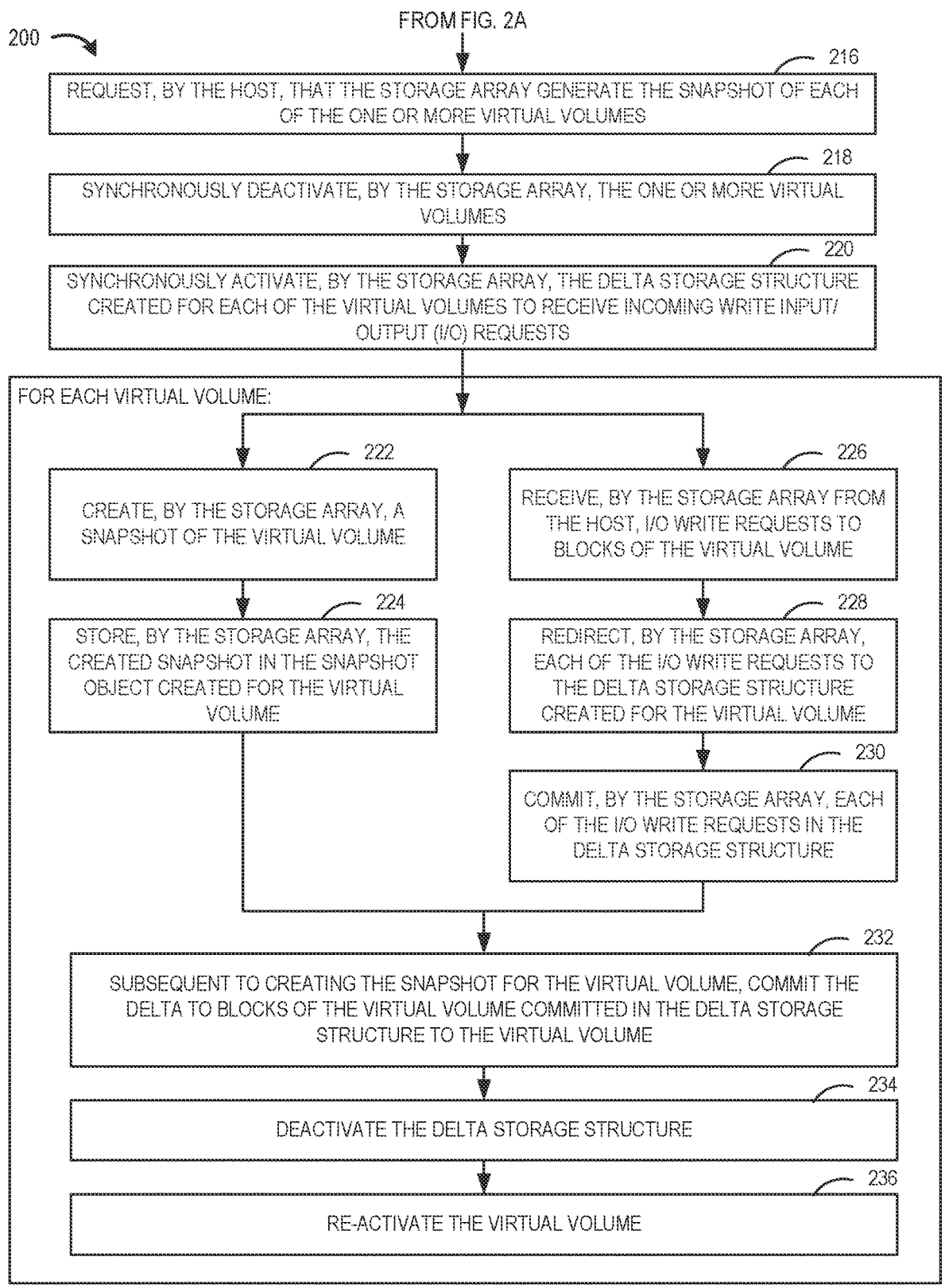
FIG. 2B is a flow diagram illustrating example operations for creating vvol snapshots using delta storage structures corresponding to each of the vvols, according to an example embodiment of the present disclosure.

FIG. 2A is a flow diagram illustrating example operations 200 for preparing a storage array 150 file system to create snapshots of vvols 158, according to an example embodiment of the present disclosure. Further, FIG. 2B is a flow diagram illustrating example operations for creating vvol 158 snapshots using delta storage structures corresponding to each of the vvols 158, according to an example embodiment of the present disclosure. In other words, FIGS. 2A and 2B illustrate operations for the first phase and second phase of snapshot creation operations, respectively, using delta storage structures 192. Operations 200 may be performed by host 102 and storage array 150(1), more specifically storage array manager 184(1), to generate a snapshot for vvols 158 created for VM 104 on host 102. For ease of explanation, and not meant to be limiting to this particular example, it may be assumed that VM 104 has five vvols 158, and each vvol 158 is managed by storage array manager 184(1). When host 102 requests that a snapshot of VM 104 be taken, a snapshot may be created for each of the five vvols 158.

Operations 200 begin, at operation 202, by host 102 determining to take a snapshot of one or more vvols 158. In this example, host 102 determines to take a snapshot 194 of VM 104, and its corresponding five vvols 158. Accordingly, at operation 204, host 102 transmits, to storage array 150(1) connected to host 102, a request to create a snapshot 194 for each of the five vvols 158 associated with VM 104. Host 102 may make this request via an API call to storage array 150(1).

In response to receiving the request, at operation 206, storage array 150(1) prepares a file system of storage array 150(1) to take a snapshot 194 of each of the five vvols 158 associated with VM 104. Preparing the file system to take the snapshots 194 may include performing operations 208-212. For example, at operation 208, storage array 150(1), and more specifically storage array manager 184(1), creates a snapshot object for holding the snapshot 194 that is to be taken for each of the vvols 158. For this example, storage array manager 184(1) creates five snapshot objects, where each snapshot object is to hold a snapshot 194 for one of the five vvols 158. At operation 210, storage array manager 184(1) generates a UUID for each created snapshot object and assigns each generated UUID to its corresponding snapshot object. At operation 212, storage array manager 184(1) creates a delta storage structure 192 for each of the vvols 158. As described above, a delta storage structure 192 stores block changes directed to a vvol 158 (e.g., since creation and activation of the delta storage structure 192) that is implemented by a storage array 150. For this example, storage array manager 184(1) creates five delta storage structures 192, where each delta storage structure 192 is associated with one of the five vvols 158. Each delta storage structure 192 is created empty and remains empty until it is activated (e.g., as described below, activation occurs at operation 218 illustrated in FIG. 2B) and can receive write I/O requests.

Operations 200 proceed, at operation 214, by storage array 150(1) returning, to host 102, a vector comprising each of the generated UUIDs. Storage array 150(1) may later use these UUIDs to request that storage array 150(1) commit the snapshots. After operation 214 is complete, the first phase of the snapshot creation operations described herein is complete.

Referring now to FIG. 2B (e.g., the second phase), at operation 216, host 102 uses the UUIDs provided by storage array 150(1) to request that storage array 150(1) generate a snapshot of each of the one or more vvols 158, and store each generated snapshot in its corresponding snapshot object (e.g., created in phase one). Host 102 may make this request via an asynchronous API call, such as a snapshotvirtualvolume API call. In this example, host 102 requests that storage array 150(1) generate five snapshots, where each snapshot is generated to capture a state of one of the five vvols 158 associated with VM 104 at a given point in time.

At operation 218, storage array manager 184(1) begins the processing of creating a snapshot for each vvol 158 by synchronously deactivating each of the one or more vvols 158. Further, at operation 220, storage array manager 184(1) synchronously activates the delta storage structure 192 created for each of the one or more vvols 158. Activation of a delta storage structure 192 created for a particular vvol 158 may allow for incoming write I/Os requesting to change blocks of the particular vvol 158 (e.g., virtual disk encapsulated by the particular vvol 158) to be stored in the delta storage structure 192. In certain embodiments, operations 218 and 220 are performed concurrently such that vvol 158(1) is deactivated and delta storage structure 192 is activated simultaneously. For this example, storage array manager 184(1) deactivates the five vvols 158 associated with VM 104, and activates a delta storage structure 192 created for and corresponding to each of the vvols 158.

Operations 200 then proceed to operations 222-236. As illustrated in FIG. 2B, operations 222-236 may be performed for each vvol 158. For example, operations 222-236 may be performed for each of the five vvols 158 in this example to generate five snapshots while also applying any incoming writes to their respective delta storage structures 192. For ease of explanation, operations 222-236 may be described with respect to a first vvol 158(1) of the five vvols 158 for which a snapshot is to be generated.

At operation 222, storage array manager 184(1), creates a snapshot of vvol 158(1). Vvol 158(1) may be deactivated at the time of the snapshot. Subsequently, at operation 224, storage array manager 184(1) stores the snapshot created for vvol 158(1) in the snapshot object created for vvol 158(1) at operation 208 (e.g., illustrated in FIG. 2A).

During operations 222 and 224, write I/O requests may be issued to vvol 158(1). Instead of committing these writes to the virtual disk encapsulated by vvol 158(1), each of these writes may be captured in delta storage structure 192 created and activated for vvol 158(1). For example, at operation 226, storage array module 184(1), may receive I/O write requests to vvol 158(1) from host 102 (e.g., where VM 104 is running). In response to receiving the I/O requests, storage array manager 184(1) transparently redirects, at operation 228, each of the I/O write requests to delta storage structure 192 associated with vvol 158(1). At operation 230, storage array manager 184(1) commits each of the I/O write requests in delta storage structure 192. Incoming writes may be continuously committed in delta storage structure 192 until the snapshot for vvol 158 is created and vvol 158 is re-activated.

Subsequent to the successful creation of the snapshot for vvol 158(1), at operation 232, storage array manager 184(1) commits the delta to blocks of vvol 158(1) committed in delta storage structure 192 (e.g., delta between blocks of vvol 158(1) and delta storage structure 192) to vvol 158(1). In certain embodiments, storage array manager 184(1) commits each block change in delta storage structure 192 to vvol 158(1) based on an order in which the block changes were committed to delta storage structure 192.

At operation 234, storage array manager 184(1) deactivates delta storage structure 192. Further, at operation 236, storage array manager 184(1) re-activates vvol 158. In certain embodiments, operations 234 and 236 are performed concurrently such that vvol 158(1) is re-activated and delta storage structure 192 is deactivated simultaneously. Although vvol 158(1) was synchronously deactivated with the other four vvols 158 associated with VM 104, at operation 236, re-activation may occur asynchronously. As such, when all block changes have been committed (e.g., from delta storage structure 192) to vvol 158(1 re-activation of vvol 158 may occur irrespective of whether or not the merge has completed for other vvols 158 and their respective delta storage structures 192.

Operations 200 may be complete after performing operation 236. As such, I/O writes may directed back to vvol 158(1), instead of delta storage structure 192, at least until a subsequent snapshot is to be created for vvol 158(1).

Figure 3:
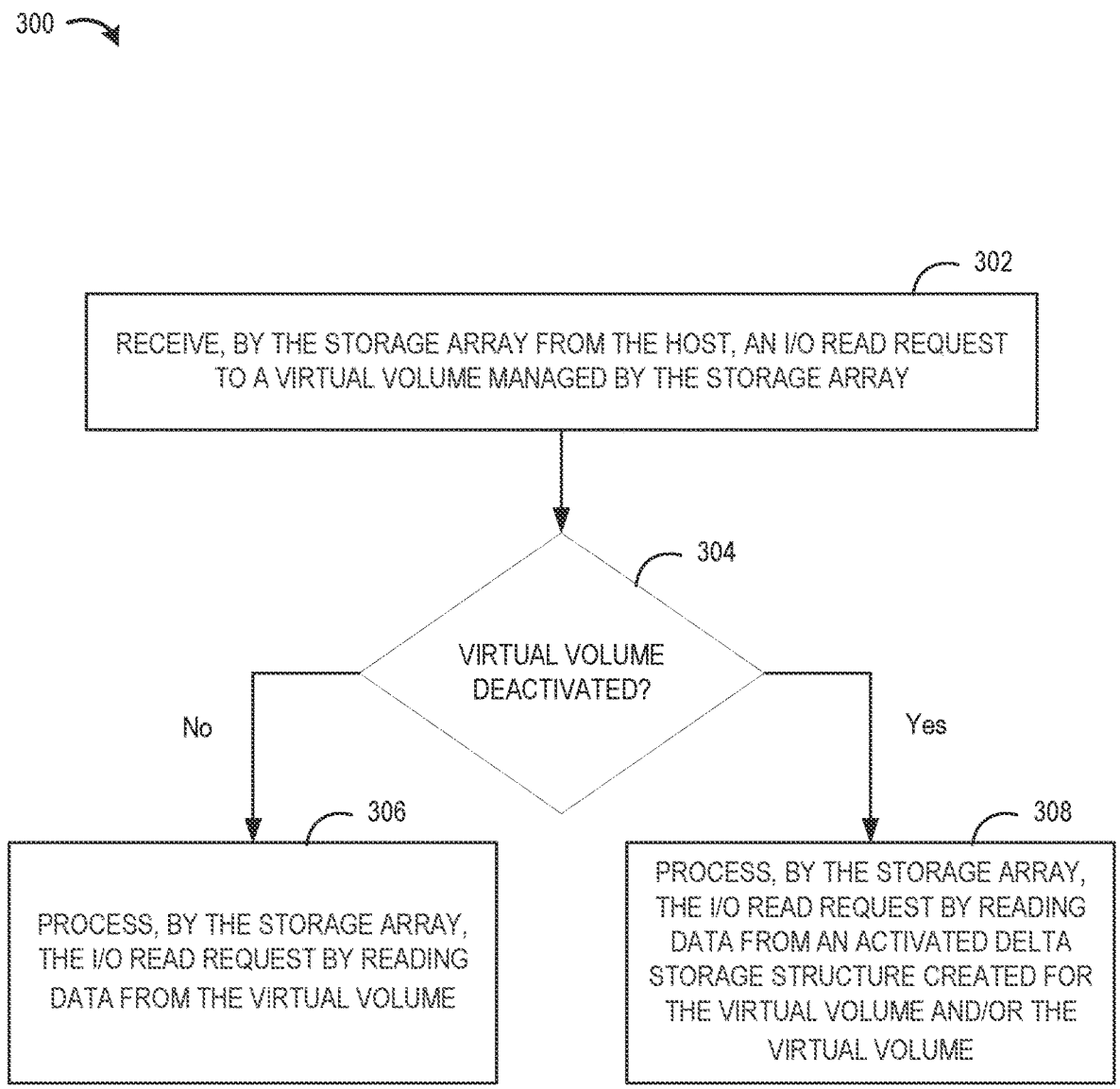
FIG. 3 is a flow diagram illustrating example operations for receiving a read input/output (I/O) request for a vvol, according to an example embodiment of the present disclosure.

In addition to receiving I/O writes from host 102 during the snapshot creation of vvols 158, storage array 150(1) may also receive I/Os requesting to read data stored at vvols 158. Operations for handling read requests directed to vvols 158 during operations 200 for snapshot creation, illustrated in FIGS. 2A and 2B, are provided in FIG. 3. In particular, FIG. 3 is a flow diagram illustrating example operations 300 for receiving a read I/O request for a vvol 158, according to an example embodiment of the present disclosure. It may be assumed that operations 300 occur while operations 200 are being performed to create a snapshot for a vvol 158.

Operations 300 begin, at operation 302, by storage array 150 receiving an I/O read request to a vvol 158 managed by storage array 150. As an illustrative example, storage array 150(1) may receive an I/O read request to vvol 158(1) managed by storage array 150(1) (e.g., where vvol 158(1) is associated with VM 104 on host 102). At operation 304, to process the received read request, storage array 150(1), and more specifically storage array manager 184(1) determines whether vvol 158(1) is deactivated. As described above, vvol 158(1) may be deactivated at operation 218 (e.g., illustrated in FIG. 2B) prior to creation of a snapshot of vvol 158(1).

Where, at operation 304, storage array manager 184(1) determines that vvol 158(1) is not deactivated (e.g., vvol 158(1) is activated and a delta storage structure 192 for vvol 158(1) is not activated), at operation 306, storage array manager 184(1) processes the I/O read request by reading data from vvol 158(1). Data read from vvol 158(1) may be returned to the requestor (e.g., application running in VM 104) issuing the I/O read request.

Alternatively, where, at operation 304, storage array manager 184(1) determines that vvol 158(1) is deactivated (e.g., vvol 158(1) is deactivated and a delta storage structure 192 for vvol 158(1) is activated), at operation 308, storage array manager 184(1) processes the I/O read request by reading data from delta storage structure 192 associated with vvol 158(1) and/or vvol 158(1). In particular, storage array manager 184(1) may determine whether the data is located in delta storage structure 192. Data may be read from delta storage structure 192 and returned to the requestor issuing the read I/O. In cases where the data cannot be found in delta storage structure 192, the data may be read from vvol 158(1) and returned to the requestor.

In certain embodiments, as described above, one or more consistency groups may be created for any number of vvols 158 (e.g., any set of crash consistent vvols). Consistency groups which are created may be for vvols 158 which are physically co-located or not physically co-located (e.g., volume boundaries may not apply when creating consistency groups). Consistency groups may be created for two or more vvols 158 being used by a VM 104, two or more vvols 158 being used by a container, two or more vvols 158 being used by a cluster application 126 running on multiple VMs 104, and/or the like. In certain embodiments, consistency groups are defined by storage array 150. In certain embodiments, consistency groups are defined by a user (e.g., an administrator). A snapshot taken for a defined consistency group (e.g., including two or more vvols 158) involves taking a snapshot for all vvols 158 of the consistency group at the same point-in-time to help ensure that consistent copies of the group of vvols 158 are being taken.

In certain embodiments, consistency groups are dynamically created and changed for each snapshot that is taken (e.g., a created consistency group may not be permanent). For example, a first consistency group may be created for a first vvol 158(1), a second vvol 158(2), and a third vvol 158(3), and a snapshot may be taken for the consistency group. At a second time, first vvol 158(1) may be removed from the first consistency group and added to a second consistency group including a fourth vvol 158(4) and a fifth vvol 158(5). A new snapshot may be taken for the second consistency at the second time. As such, from a snapshot perspective, first vvol 158(1) may belong to many consistency groups.

Further, in some cases, vvols 158 may belong to multiple consistency groups. For example, instead of removing first vvol 158(1) from the first consistency group when creating the second consistency group, the first vvol 158(1) remains as part of first consistency group such that first vvol 158(1) belongs to two consistency groups.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for virtual volume snapshot creation by a storage array, the method comprising:
    receiving a request to generate a snapshot of a virtual volume associated with a virtual machine;
    in response to receiving the request, preparing a file system of the storage array to generate the snapshot, wherein preparing the file system comprises creating a delta storage structure to receive write input/output (I/O) requests directed for the virtual volume when generating the snapshot of the virtual volume;
    deactivating the virtual volume;
    activating the delta storage structure;
    generating the snapshot of the virtual volume; and
    during the generation of the snapshot of the virtual volume:
        receiving a write I/O directed for the virtual volume; and
        committing the write I/O in the delta storage structure.

2. The method of claim 1, wherein subsequent to generating the snapshot of the virtual volume, the method further comprises:
    committing the write I/O committed in the delta storage structure to the virtual volume.

3. The method of claim 2, further comprising:
    deactivating the delta storage structure; and
    re-activating the virtual volume.

4. The method of claim 2, further comprising:
    during the committing of the write I/O committed in the delta storage structure to the virtual volume:
        receiving a read I/O requesting to read data from the virtual volume;
        determining whether the data is stored in the delta storage structure; and
        when the data is stored in the delta storage structure, retrieving the requested data from the delta storage structure; and
        when the data is not stored in the delta storage structure, retrieving the requested data from the virtual volume.

5. The method of claim 1, wherein:
    the write I/O comprises a request to make modifications to a block of data in the virtual volume; and
    committing the write I/O in the delta storage structure comprises capturing the modifications to the block of data in the delta storage structure.

6. The method of claim 1, wherein:
    the virtual volume belongs to a first consistency group comprising a first plurality of virtual volumes, including the virtual volume;
    the virtual volume is synchronously deactivated with each of the first plurality of virtual volumes belonging to the first consistency group; and
    the delta storage structure is synchronously activated with delta storage structures associated with each of the first plurality of virtual volumes belonging to the first consistency group.

7. The method of claim 6, wherein the first plurality of virtual volumes of the first consistency group comprise:
    virtual volumes associated with the virtual machine; or
    virtual volumes associated with the virtual machine and one or more other virtual machines.

8. The method of claim 6, wherein the virtual volume further belongs to a second consistency group comprising a second plurality of virtual volumes, including the virtual volume.

9. A system comprising:
    a host machine comprising at least one first memory and one or more first processors configured to:
        run a hypervisor; and
        run a virtual machine; and
    a storage array comprising:
        one or more storage units configured to store a delta storage structure and a virtual volume associated with the virtual machine; and
        at least one second memory and one or more second processors configured to:
            run a storage array manager configured to:
                receive a request to generate a snapshot of the virtual volume;
                in response to receiving the request, prepare a file system of the storage array to generate the snapshot, wherein to prepare the file system comprises to create the delta storage structure to receive write input/output (I/O) requests directed for the virtual volume when generating the snapshot of the virtual volume;
                deactivate the virtual volume;
                activate the delta storage structure;
                generate the snapshot of the virtual volume; and
                during the generation of the snapshot of the virtual volume:
                    receive a write I/O directed for the virtual volume; and
                    commit the write I/O in the delta storage structure.

10. The system of claim 9, wherein subsequent to generating the snapshot of the virtual volume, the storage array manager is further configured to:
    commit the write I/O committed in the delta storage structure to the virtual volume.

11. The system of claim 10, wherein the storage array manager is further configured to:
    deactivate the delta storage structure; and
    re-activate the virtual volume.

12. The system of claim 10, wherein the storage array manager is further configured to:
    during the committing of the write I/O committed in the delta storage structure to the virtual volume:
        receive a read I/O requesting to read data from the virtual volume;
        determine whether the data is stored in the delta storage structure; and
        when the data is stored in the delta storage structure, retrieve the requested data from the delta storage structure; and
        when the data is not stored in the delta storage structure, retrieve the requested data from the virtual volume.

13. The system of claim 9, wherein:
    the write I/O comprises a request to make modifications to a block of data in the virtual volume; and to commit the write I/O in the delta storage structure comprises to capture the modifications to the block of data in the delta storage structure.

14. The system of claim 9, wherein:
the virtual volume belongs to a first consistency group comprising a first plurality of virtual volumes, including the virtual volume;
the virtual volume is synchronously deactivated with each of the first plurality of virtual volumes belonging to the first consistency group; and
the delta storage structure is synchronously activated with delta storage structures associated with each of the first plurality of virtual volumes belonging to the first consistency group.

15. The system of claim 14, wherein the first plurality of virtual volumes of the first consistency group comprise:
virtual volumes associated with the virtual machine; or
virtual volumes associated with the virtual machine and one or more other virtual machines.

16. The system of claim 14, wherein the virtual volume further belongs to a second consistency group comprising a second plurality of virtual volumes, including the virtual volume.

17. A non-transitory computer-readable medium comprising instructions that, when executed by one or more processors of a computing system, cause the computing system to perform operations for virtual volume snapshot creation by a storage array, the operations comprising:
receiving a request to generate a snapshot of a virtual volume associated with a virtual machine;
in response to receiving the request, preparing a file system of the storage array to generate the snapshot, wherein preparing the file system comprises creating a delta storage structure to receive write input/output (I/O) requests directed for the virtual volume when generating the snapshot of the virtual volume;
deactivating the virtual volume;
activating the delta storage structure;
generating the snapshot of the virtual volume; and
during the generation of the snapshot of the virtual volume:
receiving a write I/O directed for the virtual volume; and
committing the write I/O in the delta storage structure.

18. The non-transitory computer-readable medium of claim 17, wherein subsequent to generating the snapshot of the virtual volume, the operations further comprise:
committing the write I/O committed in the delta storage structure to the virtual volume.

19. The non-transitory computer-readable medium of claim 18, wherein the operations further comprise:
deactivating the delta storage structure; and
re-activating the virtual volume.

20. The non-transitory computer-readable medium of claim 18, wherein the operations further comprise:
during the committing of the write I/O committed in the delta storage structure to the virtual volume:
receiving a read I/O requesting to read data from the virtual volume;
determining whether the data is stored in the delta storage structure; and
when the data is stored in the delta storage structure, retrieving the requested data from the delta storage structure; and
when the data is not stored in the delta storage structure, retrieving the requested data from the virtual volume.

* * * * *